United States Patent [19]

Wendling et al.

[11] Patent Number: 4,962,863
[45] Date of Patent: Oct. 16, 1990

[54] BLOW MOLDED BARREL OF THERMOPLASTIC SYNTHETIC RESIN MATERIAL

[75] Inventors: Bruno Wendling, Drulingen; Georges Roser, Weislingen, both of France

[73] Assignee: Sotralentz S.A., Drulingen, France

[21] Appl. No.: 388,828

[22] Filed: Aug. 1, 1989

[30] Foreign Application Priority Data

Mar. 3, 1989 [DE] Fed. Rep. of Germany ....... 3906831

[51] Int. Cl.$^5$ .............................................. B65D 7/42
[52] U.S. Cl. ..................................... 220/69; 220/85 K
[58] Field of Search ..................... 220/69, 70.1, 72.1, 220/85 D, 85 K

[56] References Cited

U.S. PATENT DOCUMENTS

| | | | |
|---|---|---|---|
| 3,348,722 | 10/1967 | Trevarrow, Jr. | 220/69 X |
| 3,349,940 | 10/1967 | Cornelius | 220/69 X |
| 3,747,799 | 7/1973 | Atkinson | 220/85 K |
| 3,840,141 | 10/1974 | Allom et al. | 220/69 X |
| 4,022,345 | 5/1977 | Butz | 220/85 K |
| 4,140,236 | 2/1979 | Uhlig | 220/69 |
| 4,372,458 | 2/1983 | Carlson | 220/85 K |
| 4,625,881 | 12/1986 | Carlson | 220/85 K |

FOREIGN PATENT DOCUMENTS

| | | | |
|---|---|---|---|
| 2218542 | 10/1973 | Fed. Rep. of Germany | 220/69 |
| 1558409 | 1/1980 | United Kingdom | 220/69 |

Primary Examiner—Joseph Man-Fu Moy
Attorney, Agent, or Firm—Herbert Dubno

[57] ABSTRACT

A blow molded barrel having its peripheral top and bottom walls formed unitarily from thermoplastic synthetic resin has at least a lifting and transport ring formed at its upper edge at the junction of the top wall and the peripheral wall and welded to the barrel body. The ring has a trapezoidal head which is at least limitedly elastic and is connected to the weld flange by an intermediate region which is also at least limitedly elastic to reduce the transmission of shock and thereby improve the life of the well junction between the ring and the barrel body.

5 Claims, 2 Drawing Sheets

BLOW MOLDED BARREL OF THERMOPLASTIC SYNTHETIC RESIN MATERIAL

Cross Reference to Related Applications

This application is related to the commonly assigned copending application Ser. Nos. 07/267,414 filed Nov. 4, 1988; and 07/228,903, filed Aug. 4, 1988.

Field of the Invention

Our present invention relates to a barrel and, more particularly, to a barrel composed of a thermoplastic synthetic resin, namely, a blow moldable plastic, and to a method of making the barrel. More particularly, the invention relates to a barrel of the aforedescribed type which comprises a barrel body or shell formed unitarily with a barrel bottom and a barrel top and which is provided, in the region of the top along an upper rim of the barrel, with a carrying and transport or reinforcing ring.

Background of the Invention

It is known to provide a blow molded synthetic resin barrel in one piece from a blow moldable synthetic resin or plastic material, so that the barrel comprises a barrel body having a peripheral wall and bottom and top walls which are unitarily or formed in one piece with one another, with at least the top wall being provided with a bung or other fitting or opening adapted to receive a cock or valve through which the barrel may be filled with a liquid or through which a liquid may be discharged.

The aforementioned applications, of course, are directed generally to such barrels or features thereof.

It is known to provide a radiussed transition region between the barrel peripheral wall and the top wall of the barrel and to bond a reinforcing and transport ring of a thermoplastic synthetic resin material to the material of the barrel in this radiussed transition region.

This transport ring can have a ring head with a downwardly turned shoulder beneath which the barrel can be engaged, e.g. by a fork or other tool of a forklift truck or other manipulator for the barrels.

This annular head also has a circumferential vertical inwardly turned surface and a welding flange which is welded, in the region of the radius transition, to the barrel body.

The above described construction does not exclude a similar ring at the bottom of the barrel or rolling bulges between the upper and lower rings.

The barrel can be engaged at the carrying and transport region by a manipulator which can have jaw-type pickup elements gripping the barrel beneath the shoulder of the ring and engaging over the inwardly turned surface.

In the manipulation of a barrel of the manipulator having jaw-type pickup elements, depending upon the field weight of the barrel and the nature of shocks to which the barrel may be subject, the ring and its connection with the barrel must be capable of withstanding substantial stress.

In practice, the useful life of a barrel is limited in part because the transport and carrying ring may be prematurely separated from the barrel body as a consequence of the impacts and load which the ring must bear, even if such separation occurs only at a limited number of regions or locally.

Attention is directed to the German Utility Model DE-GM No. 7,327,591 which has an annular head of such a ring which is relatively stiff and rigid.

Because of this stiffness, when the ring is welded to the barrel body during the blow molding of the latter, a project bond between the blow molded body and the ring may not develop and regions of unreliable attachment may result.

Since it cannot be excluded that the jaw-type manipulators will engage the ring in such fashion as to create singular stresses and these stresses may coincide in location with the location in which the bond is inadequate, the useful life of the well between the ring and the body may be short.

In the construction shown in FIG. 4 of German Utility Model No. 7,327,591, a shell like element is provided which is connected to the carrying and transport ring and which forms a cover for the top wall of the barrel. This construction has been found in some cases to interfere with the welding during blow molding of the barrel and in this case as well the useful life of the well is limited.

Objects of the Invention

It is the principal object of the present invention to provide an improved blow molded barrel of a thermoplastic synthetic resin and generally with the above described construction so that the transport and carrying ring can be capable of taking up the stresses which can be applied to the barrel during manipulation thereof with a manipulator having jaw-type elements, but yet which can suppress singular stresses which may be detrimental to the useful life of the weld junctions between the ring and the barrel body.

Another object of our invention is to provide an improved barrel of the type having a ring and a blow molded thermoplastic body in which the connection of the ring with the body can be more reliable and which is free from the drawbacks of earlier barrel constructions.

Yet another object of the invention is to provide an improved method of making a barrel whereby prior art disadvantages are avoided.

Summary of the Invention

These objects and others which will become apparent hereinafter are attained, in accordance with the present invention by providing the annular head of the ring in its upper region as an elastically deformable member and specifically with a substantially trapezoidal cross section so that the lower side of this trapezoidal-section head forms the lifting shoulder which is horizontal, the inner wall of the trapezoidal section head is an inner cylindrical surface facing the axis of the barrel and defines another edge of the trapezoidal cross section, and the ring is provided with a welding flange having a vertical bounding surface turned outwardly so that an intermediate portion of the ring lies between the upper junction of the vertical outer surface of the welding flange and the horizontal shoulder and the lower edge of the upwardly facing vertical wall.

According to an important feature of this invention, this intervening piece is elastically deformable at least limitedly and is formed in one piece with the welding flange and the annular head.

More specifically, the barrel of the invention can comprise:

a barrel body formed in one piece from a thermoplastic synthetic resin and having a top wall closing an upper end of the barrel, a bottom wall closing a lower end of the barrel, a peripheral wall bridging the top and bottom walls and enclosing an interior of the barrel, and a radiused transition between the peripheral wall and the top wall; and a transport and reinforcing ring fixed to the body at the radiused transition, the ring being at least limitedly elastically deformable at an upper part thereof and being formed with:

an upper and outer portion of generally trapezoidal cross section bounded by a bottom surface turned downwardly and forming a horizontal support shoulder and a vertical cylindrical inner surface turned toward a center of the barrel and the top wall, a weld flange extending downwardly from the upper portion along the radiused transition and welded thereto, the weld flange being bounded externally by a vertical outer surface, and an intermediate elastically deformable piece between the inner and outer surface and elastically connecting the upper and outer portion unitarily with the flange.

In a preferred embodiment of the invention, the intermediate piece has a radial width which increases substantially to the radial width of the shoulder.

Advantageously, and in another preferred feature of the invention, the intermediate piece has a connecting shoulder which converges toward the top wall of the body inwardly and has a radial width which is substantially equal to the radial width of the aforementioned shoulder and merges with a horizontal peripheral region of the barrel top wall in a stepless manner, i.e. flush with the top wall of the barrel body. In accordance with the invention, the ring is composed of a thermoplastic material and may be injection molded therefrom, this thermoplastic material being elastically deformable. Preferably the elastic deformability can be controlled so that, while it is relatively small, it is nevertheless sufficient to suppress singular stresses by deformation of the ring.

It is important to the present invention that a uniform welding bond be formed between the carrying and transport ring and the barrel body during the barrel body.

This can be insured in a variety of ways. For example, the carrying and transport ring can be preheated to insure a homogenious weld along the contact surface between the barrel and the ring. It has been found to be particularly important for the uniformity of the bond, to provide the ring initially in the form of two half rings which can be inserted in the respective mold cavities of a blow mold so that the mutually abutting ends of these half rings, which are to be joined together, project beyond the parting faces of the mold halves by several mm.

According to the invention, these ends of the half rings are preheated before closure of the blow mold and are brought to a thermoplastic state so that upon closure of the blow mold an automatic welding of the half ring to a single ring can occur with the half rings being thereby firmly forced into the appropriate recesses in the blow molds accommodating the ring.

The barrel body is then blow molded in the closed mold and will bond uniformly and securely to the ring.

Brief Description of the Drawing

The above and other objects, features and advantages of my invention will become more readily apparent from the following description, reference being made to the accompanying highly diagrammatic drawing in which.

Specific Description

Figure 1:
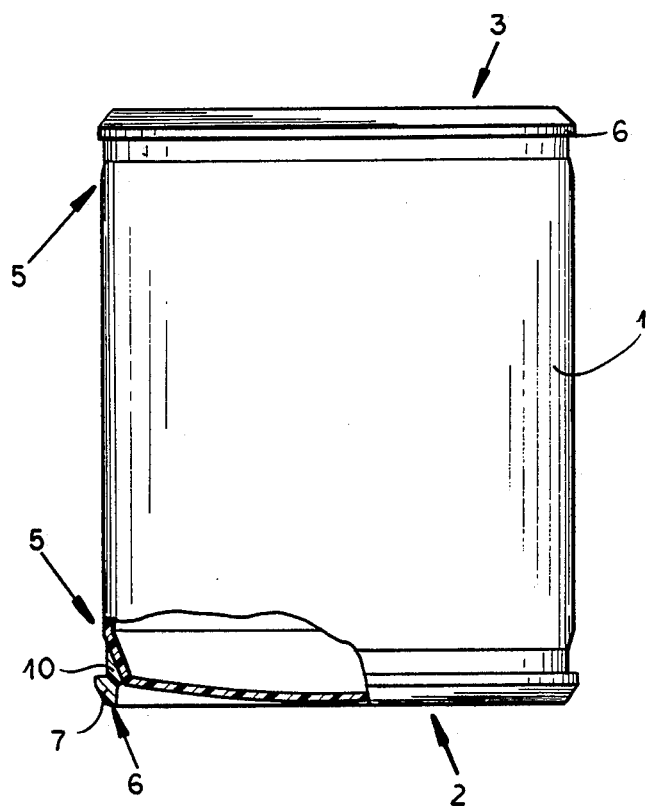
FIG. 1 is an elevational view of the barrel of the invention, partly broken away.
Figure 2:
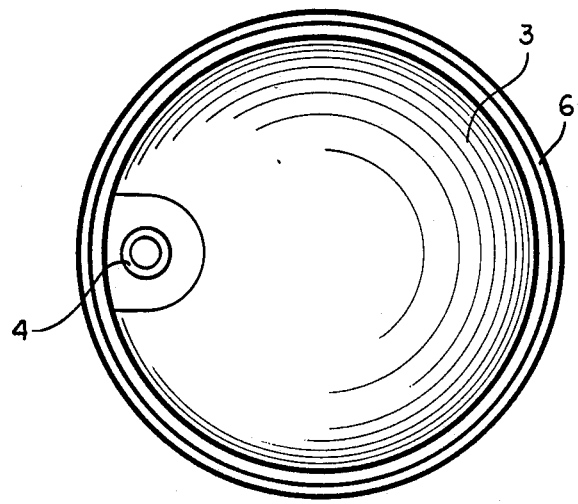
FIG. 2 is plan view of the barrel of FIG. 1.
Figure 3:
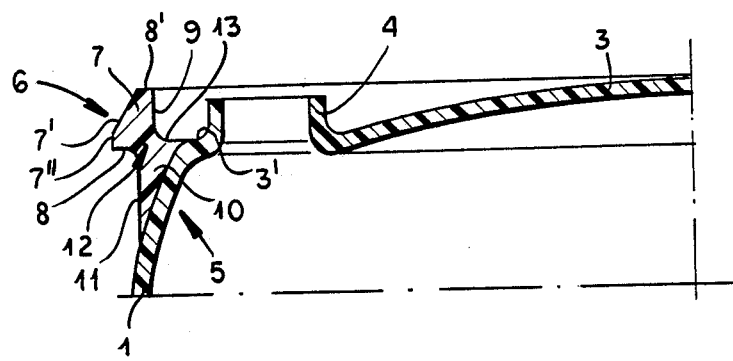
FIG. 3 is a detail view, in cross section, of the upper outer edge of the barrel, showing the transport ring greatly enlarged in scale by comparison with FIGS. 1 and 2.

FIGS. 1 through 3 illustrate a barrel, keg or drum, according to the invention, blow molded from a thermoplastic synthetic resin and comprises a generally cylindrical peripheral wall 1, a barrel bottom 2 and a top wall 3 of the barrel.

The peripheral wall, the bottom wall 2 and the top wall 3 are formed in one piece of thermoplastic synthetic resin by blow molding as described.

At least the top wall 3 is provided with at least one fitting 4 for attachment of a cock, tap or barrel closure (not shown) which can form a bung.

The upper and lower edges of the barrel are formed with radiussed transition portions 5 between the peripheral wall 1 and the top and bottom walls 3 and 2, respectively. At least the upper radius transition portion 5 (see FIG. 3) is formed with a support and transport ring 6 of thermoplastic synthetic resin material which is thermally welded and bonded to the barrel over the entire radius portion. In the embodiment illustrated in the drawing, a similar ring is provided along the bottom edge and its radius transition is, for example, a roll ring or tire.

The support and transport ring 6 comprises a ring head 7 with a downwardly turned shoulder beneath which a lifting portion of a manipulator can engage. The ring also forms a circumferential vertical inwardly facing surface 9 over which the manipulator can engage, and a weld flange 10 shaped to conform to the radius transition and which is welded to the transition region 5 as has been described.

According to this invention and as is best seen in FIG. 3, the ring head can have a substantially trapezoidal cross section which is elastically deformable at least limitedly at its upper region by virtue of the head 7 in cross section. To this end, the head 7 has a beveled outer surface 7' which is inclined toward the vertical surface 9 upwardly but is separated from this surface by a narrow horizontal surface 8'. A further narrow surface 7" can separate the beveled surface 7' from the horizontal shoulder 8 previously described.

The trapezoidal cross section is formed on its lower side by the shoulder 8 and is defined inwardly by the cylindrical surface 9.

The weld flange 10 is formed at its outer side by a vertical boundary surface or flank 11 which is cylindrical so that a junction is formed between the surfaces 8 and 12 which is separated from a junction formed between the surface 9 and a horizontal shoulder 13 from a connecting shoulder flush with the surface 3' of the top wall 3 at the region at which the top wall merges into the radiussed transition 5.

According to the invention, therefore, an intermediate piece 12, which is at least limitedly elastic is provided by the welding flange 10 between the junction of the surfaces 8 and 11 and the junction of the surfaces 8 and 11 and the junction of the surfaces 9, 13 and thus between the inner end of the surface 8 and the lower end of the surface 9.

This intermediate piece 12 has a radial width substantially equal to the radial width of the shoulder 8. The connecting shoulder 13 has a radial width also approximately equal to the radial width of the shoulder 8 and merges with the horizontal edge region of the cover or top wall 3 in a stepless or flush manner.

Thus a manipulator can readily engage the ring from below and can lock over the head 7 of the ring. The elastic deformability of the ring reduces the transmission of stress and prevents premature separation. The rings can absorb considerable impact because of the flexibility and especially the reduced width of the region 12 so that such impacts do not tend to separate the ring from the barrel.

Figure 4:
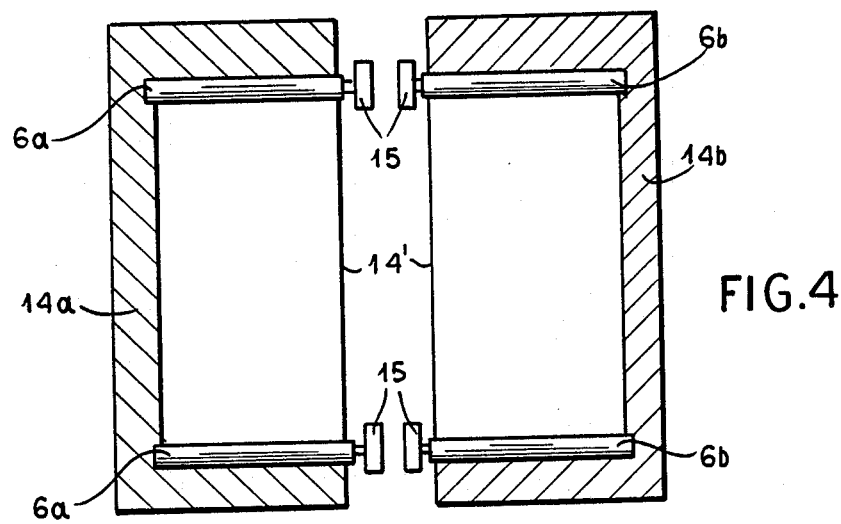
FIG. 4 is a diagrammatic view illustrating the apparatus used in the process of the invention.
Figure 5:
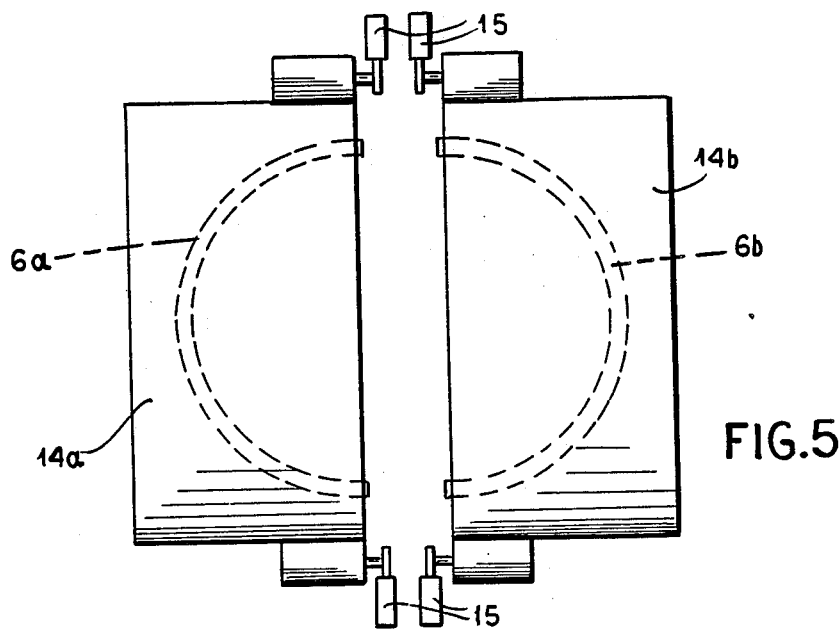
FIG. 5 is a plan view of the apparatus of FIG. 4.

FIGS. 4 and 5 have been provided to illustrate steps in the fabrication of the barrel which are important to the invention. FIG. 4, for example, shows a blow mold for the blow molding of the barrel which comprises two mold halves 14a and 14b since in vertical section in FIG. 4.

The mold halves 14a and 14b have grooves receiving half rings 6a and 6b which have been illustrated only diagrammatically in FIGS. 4 and 5 and will be understood, of course, to have the profile clearly represented in FIG. 3. In the open condition of the mold, i.e. upon separation of the mold halves 14a and 14b before the parison is inserted or the thermoplastic to be inflated in the blow mold is sandwiched between these mold halves, the ends of the half rings 6a and 6b project slightly beyond the mutually confronting surfaces 14' of the mold halves. Devices 15 are provided to heat these ends of the ring 6a and 6b which are to be brought into abutting relationship to a thermoplastified state. Thus, when the heating devices 15 are retracted from the paths of the mold halves and the mold halves close on a tubular section of the synthetic resin, the thermoplastified ring ends will be forced into abutting relationship and fuse to produce unitary rings which, upon blowing of the barrel in the mold are welded to the rings.

The closing of the mold and the blowing of the barrel are conventional in the art and have not been illustrated in the drawing.

We claim:

1. A barrel, comprising:
    a barrel body formed in one piece from a thermoplastic synthetic resin and having a top wall closing an upper end of the barrel, a bottom wall closing a lower end of the barrel, a peripheral wall bridging said top and bottom walls and enclosing an interior of the barrel, and a radiused transition between said peripheral wall and said top wall; and
    a transport and reinforcing ring fixed to said body at said radiused transition, said ring being composed of an elastically deformable thermoplastic synthetic resin and being formed with:
    an upper and outer portion of generally trapezoidal cross section bounded by a bottom surface turned downwardly and forming a horizontal support shoulder and a vertical cylindrical inner surface turned toward a center of the barrel and said top wall,
    a weld flange extending downwardly from said upper portion along said radiused transition and welded thereto, said weld flange being bounded externally by a vertical outer surface, and
    an intermediate elastically deformable piece between said inner and outer surface and elastically connecting said upper and outer portion unitarily with said flange.

2. The barrel defined in claim 1 wherein said intermediate piece has a radial width substantially equal to the radial width of said horizontal shoulder.

3. The barrel defined in claim 2 wherein said flange is formed with a connecting part having an upwardly turned surface adjoining said vertical cylindrical inner surface an d merging in a stepless manner with said top wall, said upwardly turned surface having a radial width substantially equal to the radial width of said shoulder, and said flange connecting part being no higher than said top wall whereinto said part merges.

4. The barrel defined in claim 3 wherein said ring is composed of an elastically deformable thermoplastic synthetic resin.

5. The barrel defined in claim 1 wherein said flange is formed with a connecting part having an upwardly turned surface adjoining said vertical cylindrical inner surface and merging in a stepless manner with said top wall, said upwardly turned surface having a radial width substantially equal to the radial width of said shoulder, and said flange connecting part being no higher than said top wall whereinto said part merges.

* * * * *